United States Patent
Tamura et al.

(10) Patent No.: US 12,106,582 B2
(45) Date of Patent: Oct. 1, 2024

(54) VEHICLE TRAVEL CONTROL APPARATUS

(71) Applicant: Honda Motor Co., Ltd., Tokyo (JP)

(72) Inventors: Sho Tamura, Wako (JP); Takao Tamura, Wako (JP); Shunya Takeda, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 527 days.

(21) Appl. No.: 17/411,236

(22) Filed: Aug. 25, 2021

(65) Prior Publication Data

US 2022/0067398 A1 Mar. 3, 2022

(30) Foreign Application Priority Data

Aug. 28, 2020 (JP) .................... 2020-144504
May 25, 2021 (JP) .................... 2021-087318

(51) Int. Cl.
*G06V 20/56* (2022.01)
*B60W 30/12* (2020.01)
(Continued)

(52) U.S. Cl.
CPC ........... *G06V 20/588* (2022.01); *B60W 30/12* (2013.01); *B60W 40/06* (2013.01); *B60W 50/14* (2013.01);
(Continued)

(58) Field of Classification Search
CPC ..... G06V 20/588; G06V 20/56; B60W 30/12; B60W 40/06; B60W 50/14; B60W 60/0053; B60W 60/0059; B60W 2050/143; B60W 2050/146; B60W 2520/16; B60W 2520/18; B60W 2552/05; B60W 2552/15;
(Continued)

(56) References Cited

U.S. PATENT DOCUMENTS

2019/0071080 A1* 3/2019 Shimizu .............. G05D 1/0246

FOREIGN PATENT DOCUMENTS

JP 2005300294 A 10/2005
JP 2013129289 A 7/2013
(Continued)

OTHER PUBLICATIONS

Koyama Hajime, Travel Control Device for Vehicle, machine translation of Japan patent publication No. 2016162299 (Year: 2016).*

(Continued)

*Primary Examiner* — Vu Le
*Assistant Examiner* — Lei Zhao
(74) *Attorney, Agent, or Firm* — Duft & Bornsen, PC

(57) ABSTRACT

A vehicle travel control apparatus configured to control a traveling operation of a vehicle including an actuator for traveling, the vehicle travel control apparatus including a sensor mounted on the vehicle to capture an image of a division line in a traveling direction of the vehicle or measure the division line and an electronic control unit including a microprocessor. The microprocessor is configured to perform controlling the actuator based on a position information of the division line obtained by the sensor and a reliability with respect to the position information of the division line obtained by the sensor, and setting the reliability based on a shape of a road surface or a road structure in the traveling direction of the vehicle.

15 Claims, 7 Drawing Sheets

(51) Int. Cl.
*B60W 40/06* (2012.01)
*B60W 50/14* (2020.01)
*B60W 60/00* (2020.01)

(52) U.S. Cl.
CPC .... *B60W 60/0053* (2020.02); *B60W 60/0059* (2020.02); *B60W 2050/143* (2013.01); *B60W 2050/146* (2013.01); *B60W 2520/16* (2013.01); *B60W 2520/18* (2013.01); *B60W 2552/05* (2020.02); *B60W 2552/15* (2020.02); *B60W 2552/30* (2020.02); *B60W 2552/35* (2020.02); *B60W 2552/53* (2020.02); *B60W 2556/40* (2020.02)

(58) Field of Classification Search
CPC ......... B60W 2552/30; B60W 2552/35; B60W 2552/53; B60W 2556/40; B60W 2420/403; B60W 2556/20; B60W 2556/50; B60W 30/165; B60W 60/001; B60W 60/005
See application file for complete search history.

(56) References Cited

FOREIGN PATENT DOCUMENTS

| | | |
|---|---|---|
| JP | 2016162299 A | 9/2016 |
| JP | 2017054296 A | 3/2017 |
| JP | 2019046363 A | 3/2019 |
| JP | 6614353 B2 | 12/2019 |
| JP | 2020006877 A | 1/2020 |

OTHER PUBLICATIONS

Kakinuma Buichi, Two-Wheeled Vehicle and Car Body Braking Device, machine translation of Japan patent publication No. 2004217170 (Year: 2004).*

Japanese Office action; Application 2021-087318; Oct. 18, 2022.

* cited by examiner

VEHICLE TRAVEL CONTROL APPARATUS

CROSS-REFERENCE TO RELATED APPLICATION

This application is based upon and claims the benefit of priority from Japanese Patent Application No. 2020-144504 filed on Aug. 28, 2020 and Japanese Patent Application No. 2021-087318 filed on May 25, 2021, the content of which is incorporated herein by reference.

BACKGROUND OF THE INVENTION

Field of the Invention

This invention relates to a vehicle travel control apparatus controlling a travel operation of a vehicle based on information obtained by a vehicle-mounted camera, etc.

Description of the Related Art

As this type of apparatus, conventionally, there is a known apparatus for controlling a traveling actuator so as to follow a preceding vehicle, based on an image signal from a camera mounted on a vehicle. Such an apparatus is described, for example, in Japanese Patent Publication No. 6614353 (JP6614353B). In the apparatus described in JP6614353B, a division line of a lane in which the subject vehicle travels is detected based on the image signal from the camera, and a lane keeping control of the vehicle is performed based on the detected division line. Then, when the division line is not detected, a virtual division line is estimated based on a relative position of the preceding vehicle with respect to the current subject vehicle and a relative position of the division line with respect to the preceding vehicle detected in the past, and the lane keeping control is performed based on the virtual division line.

However, affected by a structure and a road surface shape of the road on which the vehicle travels, there is a possibility that the deviation occurs between a lane position determined based on the division line detected by the vehicle-mounted camera or the like and an actual lane position, as a result, there is a possibility that interferes with the travel control of the vehicle.

SUMMARY OF THE INVENTION

An aspect of the present invention is a vehicle travel control apparatus configured to control a traveling operation of a vehicle including an actuator for traveling. The vehicle travel control apparatus includes: a sensor mounted on the vehicle to capture an image of a division line in a traveling direction of the vehicle or measure the division line; and an electronic control unit including a microprocessor and a memory connected to the microprocessor. The microprocessor is configured to perform: controlling the actuator based on a position information of the division line obtained by the sensor and a reliability with respect to the position information of the division line obtained by the sensor, and setting the reliability based on a shape of a road surface or a road structure in the traveling direction of the vehicle.

Another aspect of the present invention is a vehicle travel control apparatus configured to control a traveling operation of a vehicle including an actuator for traveling. The vehicle travel control apparatus includes: a sensor mounted on the vehicle to capture an image of a division line in a traveling direction of the vehicle or measure the division line; and an electronic control unit including a microprocessor and a memory connected to the microprocessor. The microprocessor is configured to perform controlling the actuator based on a position information of the division line obtained by the sensor, determining whether a predetermined road surface condition in which a degree of any of a step, a gradient or an undulation of a road surface including the division line in the traveling direction of the vehicle captured or measured by the sensor is greater than or equal to a predetermined degree, is satisfied, or, whether a predetermined road condition in which a road including the division line in the traveling direction of the vehicle captured or measured by the sensor is any of a tunnel road having a tunnel, a curved road or a branch road, is satisfied, and the controlling including controlling the actuator based on the position information of the division line obtained by the sensor when it is determined that the predetermined road surface condition is not satisfied or the predetermined road condition is not satisfied, while stopping controlling the actuator based on the position information of the division line obtained by the sensor when it is determined that the predetermined road surface condition is satisfied or when it is determined that the predetermined road condition is satisfied.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

Hereinafter, an embodiment of the present invention is explained with reference to FIGS. 1 to 8. A vehicle travel control apparatus according to an embodiment of the present invention is applied to a vehicle having a driver assistance capability or a self-driving capability. In the following description, an example in which the vehicle travel control apparatus is applied to the vehicle having the self-driving capability (self-driving vehicle) will be explained. The self-driving vehicle may be sometimes called "subject vehicle" to differentiate it from other vehicles.

Figure 1:
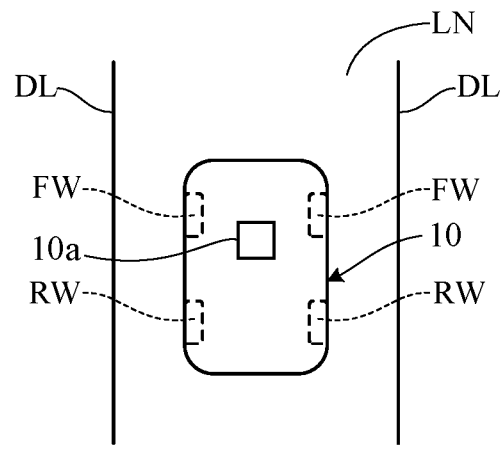
FIG. 1 is a plan view of a road schematically illustrating an example of a traveling scene of a subject vehicle to which a vehicle travel control apparatus according to an embodiment of the invention is applied.

FIG. 1 is a plan view of a road schematically illustrating an example of a traveling scene of the subject vehicle 10. FIG. 1 illustrates an example in which the subject vehicle 10 travels along a lane LN defined by a pair of left and right division lines DL extending in parallel to each other, that is, an example in which the subject vehicle 10 travels in a lane keeping manner. The division line DL includes a boundary line of a plurality of lanes LN, a boundary line between a sidewalk or a bicycle road and the lane LN, a center line of a two-way traffic, and the like.

The subject vehicle 10 is configured as a four-wheel drive vehicle having a pair of left and right front wheels FW and a pair of left and right rear wheels RW. The subject vehicle 10 includes a travel drive source 10a for generating a travel driving force, a not-shown braking device for braking the subject vehicle 10 and a not-shown turning device for turning the front wheels FW. The travel drive source 10a is an internal combustion engine (engine), travel motor or both of the engine and the travel motor. Therefore, the subject vehicle is an engine vehicle, electric vehicle or hybrid vehicle.

The subject vehicle 10 can travel not only in a self-drive mode in which a driving operation by a driver is unnecessary, but also in a manual drive mode in which the driving operation by the driver is necessary. For example, in a state where the vehicle travels in the self-drive mode without operating (hands-off) a steering wheel, the vehicle can travel in the manual drive mode by operating (hands-on) the steering wheel. Alternatively, the vehicle can travel in the hands-on state by lowering an automatic driving level by one step or two or more steps in accordance with a command from a vehicle control system from the state of traveling in the hands-off state at a predetermined automatic driving level.

Figure 2:
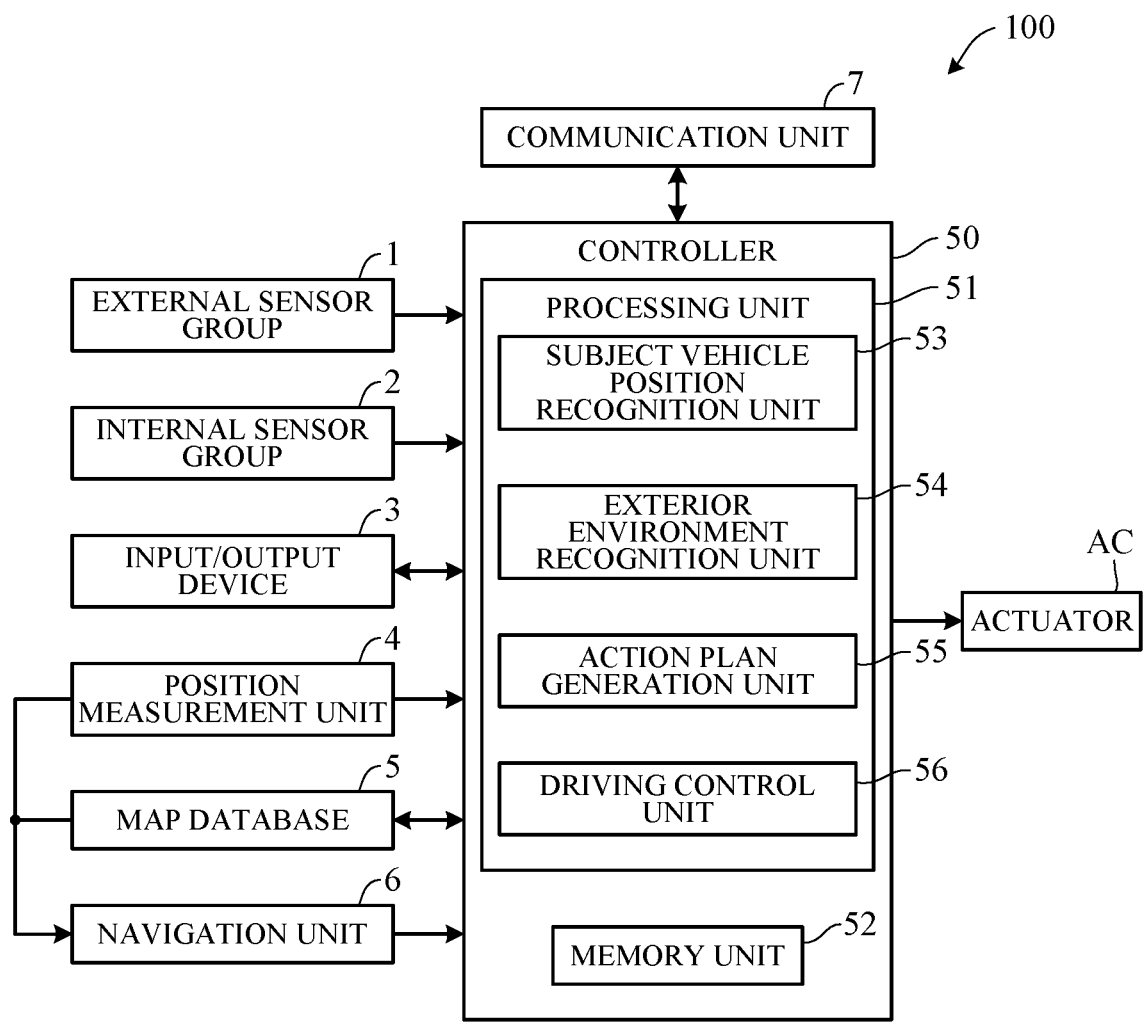
FIG. 2 is a block diagram schematically illustrating an overall configuration of a vehicle control system having the vehicle travel control apparatus according to the embodiment of the present invention.

FIG. 2 is a block diagram schematically illustrating an overall configuration of a vehicle control system 100 having the vehicle travel control apparatus according to an embodiment of the present invention. As shown in FIG. 2, the vehicle control system 100 mainly includes a controller 50, and an external sensor group 1, an internal sensor group 2, an input/output device 3, a position measurement unit 4, a map database 5, a navigation unit 6, a communication unit 7 and actuators AC which are communicably connected with the controller 50.

The term external sensor group 1 herein is a collective designation encompassing multiple sensors (external sensors) for detecting external circumstances constituting subject vehicle ambience data. For example, the external sensor group 1 includes, inter alia, a LIDAR (Light Detection and Ranging) for measuring distance from the subject vehicle 10 to ambient obstacles by measuring scattered light produced by laser light radiated from the subject vehicle 10 in every direction, a RADAR (Radio Detection and Ranging) for detecting other vehicles and obstacles around the subject vehicle 10 by radiating electromagnetic waves and detecting reflected waves, and a CCD, CMOS or other image sensor-equipped on-board cameras for imaging subject vehicle ambience (forward, reward and sideways).

The term internal sensor group 2 herein is a collective designation encompassing multiple sensors (internal sensors) for detecting driving state of the subject vehicle 10. For example, the internal sensor group 2 includes, inter alia, a vehicle speed sensor for detecting vehicle speed of the subject vehicle 10, acceleration sensors for detecting forward-rearward direction acceleration and lateral acceleration of the subject vehicle 10, respectively, rotational speed sensor for detecting rotational speed of the travel drive source 10a, a yaw rate sensor for detecting rotation angle speed around a vertical axis passing center of gravity of the subject vehicle 10 and the like. The internal sensor group 2 also includes sensors for detecting driver driving operations in manual drive mode, including, for example, accelerator pedal operations, brake pedal operations, steering wheel operations and the like.

The term input/output device 3 is used herein as a collective designation encompassing apparatuses receiving instructions input by the driver and outputting information to the driver. The input/output device 3 includes, inter alia, switches which the driver uses to input various instructions, a microphone which the driver uses to input voice instructions, a display for presenting information to the driver via displayed images, and a speaker for presenting information to the driver by voice.

The position measurement unit (GNSS unit) 4 includes a position measurement sensor for receiving signal from positioning satellites to measure the location of the subject vehicle. The positioning satellites are satellites such as GPS satellites and Quasi-Zenith satellite. The position measurement unit 4 measures absolute position (latitude, longitude and the like) of the subject vehicle 10 based on signal received by the position measurement sensor.

The map database 5 is a unit storing general map data used by the navigation unit 6 and is, for example, implemented using a hard disk or semiconductor element. The map data include road position data and road shape (curvature etc.) data, along with intersection and road branch position data. The map data stored in the map database 5 are different from high-accuracy map data stored in a memory unit 52 of the controller 50.

The navigation unit 6 retrieves target road routes to destinations input by the driver and performs guidance along selected target routes. Destination input and target route guidance is performed through the input/output device 3. Target routes are computed based on current position of the subject vehicle 10 measured by the position measurement unit 4 and map data stored in the map database 5.

The communication unit 7 communicates through networks including the Internet and other wireless communication networks to access servers (not shown in the drawings) to acquire map data, traffic data and the like, periodically or at arbitrary times. The networks include not only public wireless communications network, but also closed communications networks, such as wireless LAN, Wi-Fi and Bluetooth, which are established for a predetermined administrative area. Acquired map data are output to the map database 5 and/or memory unit 52 via the controller 50 to update their stored map data.

The actuators AC are actuators for traveling of the subject vehicle 10. If the travel drive source 10a is the engine, the actuators AC include a throttle actuator for adjusting opening angle of the throttle valve of the engine (throttle opening angle). If the travel drive source 10a is the travel motor, the actuators AC include the travel motor. The actuators AC also include a brake actuator for operating a braking device and turning actuator for turning the front wheels FW.

The controller 50 is constituted by an electronic control unit (ECU). More specifically, the controller 50 incorporates a computer including a CPU or other processing unit (a microprocessor) 51 for executing a processing in relation to travel control, the memory unit (a memory) 52 of RAM, ROM and the like, and an input/output interface or other peripheral circuits not shown in the drawings. In FIG. 2, the controller 50 is integrally configured by consolidating multiple function-differentiated ECUs such as an engine control ECU, a transmission control ECU and so on. Optionally, these ECUs can be individually provided.

The memory unit 52 stores high-accuracy detailed road map data (road map information). The road map information includes information on road position, information on road shape (curvature, etc.), information on gradient of the road, information on position of intersections and branches, information on the number of lanes, and information on width of the lane LN and the position of each lane. The position information for each lane is information on position of the center of the lane LN and information on the boundary line of the lane LN, i.e., position information of the division line DL. In addition, the road map information includes information on road surface profile (road surface property) at each position of the road, that is, the value of the unevenness of the road surface from the reference height, and information representing the change of the unevenness (gradient of the road surface). The memory unit 52 also stores information such as programs for various controls, thresholds used in the programs, information indicating the positional relationships between the position of the subject vehicle 10 detected by the position measurement unit 4 and the position of the front wheel FW and between the position of the subject vehicle 10 detected by the position measurement unit 4 and the position of the rear wheel RW, and the like.

Among the road map information stored in the memory unit 52, the information on the road surface profile is updated every time the road surface profile is generated, and the other road map information is updated at a predetermined cycle or at an arbitrary timing. The road surface profile is generated by, for example, a road surface profile generation apparatus provided in a server device (not shown) capable of communicating with the vehicle control system 100.

The road surface profile generation apparatus generates a road surface profile from data obtained by running a dedicated vehicle for measuring road surface properties, for example. Specifically, a dedicated vehicle equipped with a laser profiler is run, and the measured data at that time is acquired together with the position data of the dedicated vehicle to generate a road surface profile. It is also possible to generate a road surface profile by obtaining a detecting value from a sensor having a correlation with the unevenness of the road surface (e.g., lateral acceleration sensor for detecting lateral acceleration) among sensors provided in various vehicles, and collecting the detecting values from various vehicles.

As functional configurations in relation to mainly self-driving, the processing unit 51 includes a subject vehicle position recognition unit 53, an external environment recognition unit 54, an action plan generation unit 55, and a driving control unit 56.

The subject vehicle position recognition unit 53 recognizes the position of the subject vehicle 10 (subject vehicle position) on the map based on position information of the subject vehicle 10 calculated by the position measurement unit 4 and map information stored in the map database 5. Optionally, the subject vehicle position can be recognized using map information (building shape data, road surface profile data and the like) stored in the memory unit 52 and ambience data of the subject vehicle 10 detected by the external sensor group 1, whereby the subject vehicle position can be recognized with high accuracy. Optionally, when the subject vehicle position can be measured by sensors installed externally on the road or by the roadside, the subject vehicle position can be recognized with high accuracy by communicating with such sensors through the communication unit 7.

The external environment recognition unit 54 recognizes external circumstances around the subject vehicle 10 based on signals from cameras, LIDERs, RADARs and the like of the external sensor group 1. For example, it recognizes position, speed and acceleration of nearby vehicles (forward vehicle or rearward vehicle) driving in the vicinity of the subject vehicle 10, position of vehicles stopped or parked in the vicinity of the subject vehicle 10, and position and state of other objects. Other objects include traffic signs, traffic lights, road boundary and stop lines, buildings, guardrails, power poles, commercial signs, pedestrians, bicycles, and the like. Recognized states of other objects include, for example, traffic light color (red, green or yellow) and moving speed and direction of pedestrians and bicycles.

The action plan generation unit 55 generates a driving path (target path) of the subject vehicle 10 from present time point to a certain time ahead based on, for example, a target route computed by the navigation unit 6, subject vehicle position recognized by the subject vehicle position recognition unit 53, and external circumstances recognized by the external environment recognition unit 54. When multiple paths are available on the target route as target path candidates, the action plan generation unit 55 selects from among them the path that optimally satisfies legal compliance, safe efficient driving and other criteria, and defines the selected path as the target path. The action plan generation unit 55 then generates an action plan matched to the generated target path. An action plan is also called "travel plan". The action plan generation unit 55 generates various kinds of action plans corresponding to overtake traveling for overtaking the forward vehicle, lane-change traveling to move from one traffic lane to another, lane-keep traveling to maintain same lane, deceleration or acceleration traveling. When generating a target path, the action plan generation unit 55 first decides a drive mode and generates the target path in line with the drive mode.

In self-drive mode, the driving control unit 56 controls the actuators AC to drive the subject vehicle 10 along target path generated by the action plan generation unit 55. More specifically, the driving control unit 56 calculates required driving force for achieving the target accelerations of sequential unit times calculated by the action plan generation unit 55, taking running resistance caused by road gradient and the like into account. And the driving control unit 56 feedback-controls the actuators AC to bring actual acceleration detected by the internal sensor group 2, for example, into coincidence with target acceleration. In other words, the driving control unit 56 controls the actuators AC so that the subject vehicle 10 travels at target speed and target acceleration. On the other hand, in manual drive mode, the driving control unit 56 controls the actuators AC in accordance with driving instructions by the driver (steering operation and the like) acquired from the internal sensor group 2.

When the subject vehicle 10 travels in the self-drive mode, for example, in the lane keeping manner by the vehicle control system 100 thus configured, the controller 50 recognizes the division line DL on the road surface in the traveling direction of the subject vehicle 10 based on an image or the like captured by the in-vehicle camera, and controls the actuator AC so that the subject vehicle 10 travels along the division line DL. Therefore, in order to perform self-driving well, it is necessary for the vehicle control system 100 (controller 50) to accurately recognize the division line DL by signal from the in-vehicle camera or the like.

However, if there is unevenness or undulation on the road surface during traveling, the subject vehicle 10 performs a pitch motion or a roll motion to change a vehicle posture, and recognition accuracy of the division line DL based on the signal from the in-vehicle camera or the like may decrease. When the recognition accuracy of the division line DL decreases, the automatic driving level is automatically lowered by the vehicle control system 100. As a result, it becomes necessary for the driver to operate the steering wheel and drive (for example, drive in manual drive mode), and it becomes difficult for the subject vehicle 10 to continuously travel by self-driving. Thus, in the present embodiment, the vehicle travel control apparatus is configured as follows so that the vehicle travel control can be performed well even when the recognition accuracy of the division line DL based on the signal from the in-vehicle camera or the like decreases. The decrease of the recognition accuracy of the division line DL occurs in a predetermined road surface shape such as a step, a gradient, or an undulation of the road surface, and in a predetermined road structure such as an entrance and exit of a tunnel, a curved road, or a branch road. Hereinafter, in particular, a case where the recognition accuracy decreases due to the undulation of the road surface will be described.

Figure 3:
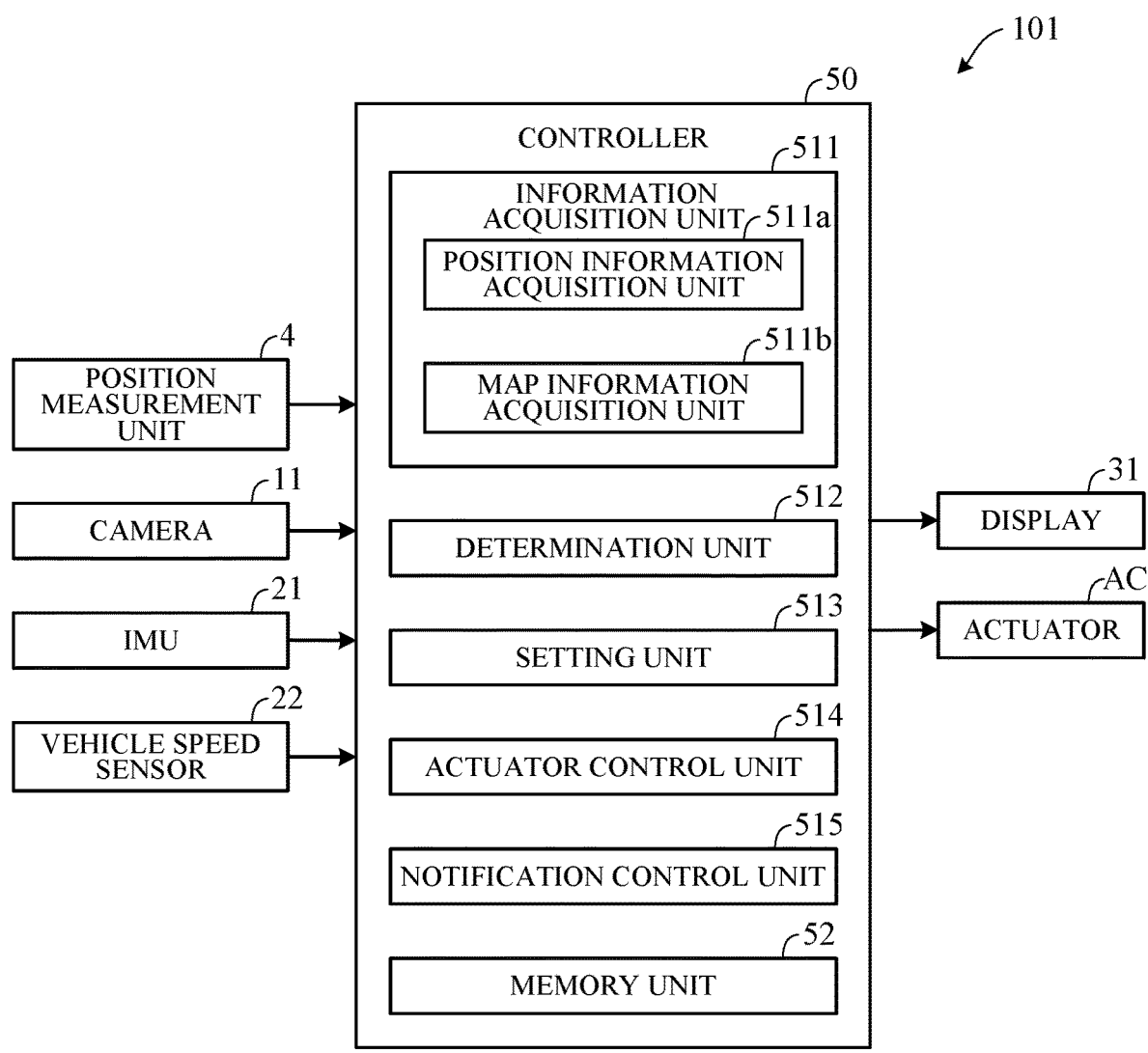
FIG. 3 is a block diagram illustrating a configuration of main part of the vehicle travel control apparatus according to the embodiment of the present invention.

FIG. 3 is a block diagram illustrating a configuration of main part of a vehicle travel control apparatus 101 according to the embodiment of the present invention. The vehicle travel control apparatus 101 mainly controls traveling operation of the subject vehicle 10 in self-drive mode, and constitutes a part of the vehicle control system 100 of FIG. 2. As illustrated in FIG. 3, the vehicle travel control apparatus 101 includes the controller 50, the position measurement unit 4, a camera 11, an IMU 21, a vehicle speed sensor 22, a display 31, and the actuator AC.

The camera 11 is a monocular camera having an imaging element (image sensor) such as a CCD or a CMOS, and constitutes a part of the external sensor group 1 in FIG. 2. The camera 11 is attached to, for example, a predetermined position in the front of the subject vehicle 10, continuously captures an image of a space in front of the subject vehicle 10, and acquires an image (camera image) of an object. The object includes the pair of left and right division lines DL obliquely ahead of the vehicle. There is a predetermined correlation between a position of the object on the camera image and an actual position of the object (relative position with respect to the camera 11). This correlation is stored in advance in the memory unit 52, and the actual position of the object (relative position with respect to the camera 11) can be detected from the camera image using this correlation. A stereo camera may be used as the camera 11 instead of the monocular camera, and the actual position of the object may be detected by the stereo camera. The camera images acquired by the camera 11 are transmitted to the controller 50 at predetermined time intervals.

The IMU (Internal Measurement Unit) 21 is a device that detects a physical quantity representing a motion state of the subject vehicle 10, more specifically, an inertial measurement device that detects an angle or an angular velocity around three orthogonal axes and an acceleration, and constitutes a part of the internal sensor group 2 in FIG. 2. The IMU 21 can detect a swing angle (pitch angle) in the front-rear direction of the subject vehicle 10 and a swing angle (roll angle) in the left-right direction of the subject vehicle 10. Detection values of the IMU 21 are transmitted to the controller 50 at predetermined time intervals. The vehicle speed sensor 22 also constitutes a part of the internal sensor group 2 in FIG. 2, and vehicle speed data of the subject vehicle 10 detected by the vehicle speed sensor 22 is transmitted to the controller 50 at predetermined time intervals.

The display 31 is provided, for example, on an instrument panel in a vehicle interior. The display 31 constitutes a part of the input/output device 3 in FIG. 2. The display 31 displays, for example, information for prompting the driver to operate the steering wheel (hands-on) and information for giving notice and notification of switching to the manual drive mode.

The controller 50 includes, as a functional configuration, an information acquisition unit 511, a determination unit 512, a setting unit 513, an actuator control unit 514, a notification control unit 515, and the memory unit 52. The information acquisition unit 511 is included, for example, in the subject vehicle position recognition unit 53 in FIG. 2, the determination unit 512 is included in the external environment recognition unit 54 in FIG. 2, and the setting unit 513 and the actuator control unit 514 are included in the action plan generation unit 55 and the driving control unit 56 in FIG. 2.

The information acquisition unit 511 includes a position information acquisition unit 511a that acquires information on the current position of the subject vehicle 10, and a map information acquisition unit 511b that acquires information on the road surface profile in the traveling direction of the subject vehicle 10 corresponding to the current position, that is, gradient information of the road surface. The position information acquisition unit 511a acquires the current position information of the subject vehicle 10 based on signal from the position measurement unit 4. The map information acquisition unit 511b acquires the information on the road surface profile within a predetermined distance (for example, 200 m) in the traveling direction from the current position of the subject vehicle 10 among the road map information stored in the memory unit 52.

The determination unit 512 determines whether the degree of undulation of the road surface in the traveling direction of the subject vehicle 10, that is, a degree of change in a road surface gradient is a predetermined degree or more. This determination is a determination as to whether or not a predetermined road surface condition is satisfied. Whether or not the predetermined road surface condition is satisfied is determined based on an image of the division line DL in front of the subject vehicle 10 captured by the camera 11, the pitch angle and the roll angle of the subject vehicle 10 detected by the IMU 21, and the gradient information of the road surface acquired by the map information acquisition unit 511b.

Figure 4:
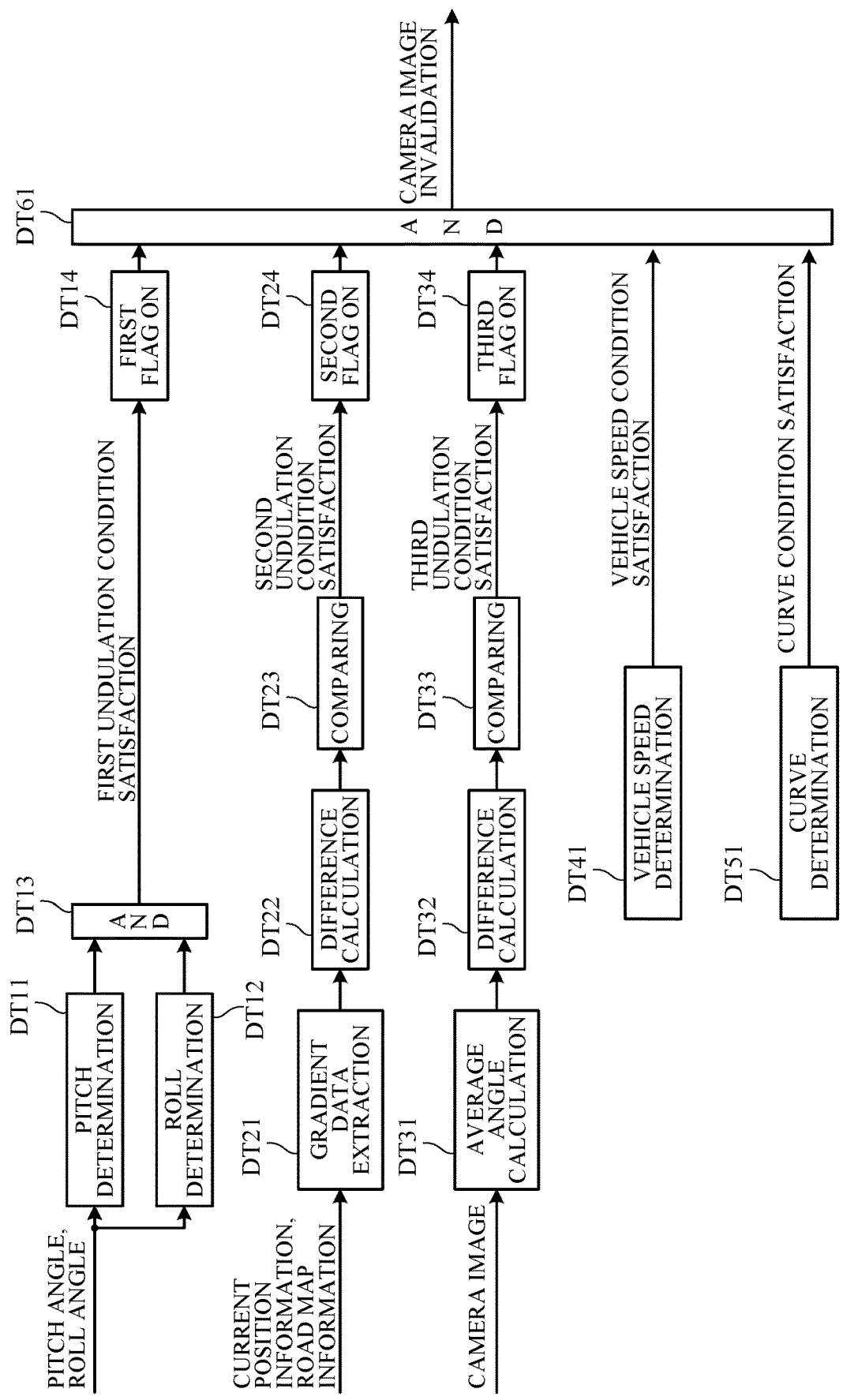
FIG. 4 is a block diagram illustrating an example of processing in a determination unit of FIG. 3.

FIG. 4 is a block diagram illustrating an example of processing in the determination unit 512. The determination unit 512 also determines whether or not a first undulation condition, a second undulation condition, and a third undulation condition are satisfied. Whether or not the first undulation condition is satisfied is determined based on the detection value of the IMU 21, whether or not the second undulation condition is satisfied is determined based on the road surface gradient information acquired by the map information acquisition unit 511b, and whether or not the third undulation condition is satisfied is determined based on the image from the camera 11.

First, the first undulation condition will be described. As illustrated in FIG. 4, the determination circuit DT11 determines whether or not a predetermined pitch motion of the subject vehicle 10 is detected. More specifically, the determination circuit DT11 first calculates a change rate (pitch rate θa) of data of the pitch angle detected by the IMU 21 every predetermined time. For example, the pitch rate θa is calculated from a difference between the data detected this time and the data detected immediately before that, or by using data of three or more consecutive pitch angles. When the pitch rate θa is more than 0 (θa>0), the subject vehicle 10 is in a forward tilting posture (head-down) in which the front faces downward, and when the pitch rate θa is less than 0 (θa<0), the subject vehicle 10 is in a backward tilting posture (head-up) in which the front faces upward.

In addition, the determination circuit DT11 determines whether or not the pitch rate θa has become a negative predetermined value θa2 or less within a predetermined time after the pitch rate θa has become a positive predetermined value θa1 or more. That is, it is determined whether or not the subject vehicle 10 heads up within a predetermined time after the head-down, in other words, whether or not the pitch condition is satisfied.

The determination circuit DT12 determines whether or not a predetermined roll motion of the subject vehicle 10 is detected. More specifically, the determination circuit DT12 first calculates a change rate (roll rate θb) of data of the roll angle detected by the IMU 21 every predetermined time. For example, the roll rate θb is calculated from a difference between the data detected this time and the data detected immediately before that, or by using data of three or more consecutive roll angles. When the roll rate θb is more than 0 (θb>0), the subject vehicle 10 inclines to the right (right-roll), and when the roll rate θb is less than 0 (θb<0), the subject vehicle 10 inclines to the left (left-roll).

In addition, the determination circuit DT12 determines whether or not the roll rate θb has become a negative predetermined value θb2 or less within a predetermined time after the roll rate θb has become a positive predetermined value θb1 or more. That is, it is determined whether or not the subject vehicle 10 has rolled to the left within a predetermined time after rolling to the right. It is furthermore determined whether or not the roll rate θb has become the predetermined value θ1 or more within a predetermined time after the roll rate θb has become the predetermined value θb2 or less, that is, whether or not the subject vehicle 10 has rolled to the right within a predetermined time after rolling to the left. This is a determination as to whether or not the roll condition is satisfied.

An AND circuit DT13 determines whether or not both the pitch condition and the roll condition are satisfied. More specifically, the AND circuit DT13 determines whether or not the subject vehicle 10 rolls to the right while heading down and then rolls to the left while heading up, or whether or not the subject vehicle 10 rolls to the left while heading down and then rolls to the right while heading up. This determination is a determination as to whether or not the subject vehicle 10 is traveling under a condition in which the division line DL is likely to be erroneously recognized.

That is, there is a difference in how the camera 11 captures the division line DL between when there is a downward slope in front of the subject vehicle and when there is an upward slope in front of the subject vehicle. In addition, there is a difference in how the camera 11 captures the division line DL between when the subject vehicle 10 rolls to the right and when the subject vehicle 10 rolls to the left. In particular, when a combination of the head-up and one of the left and right rolls occurs after a combination of the head-down and the other of the left and right rolls, the division line DL recognized by the camera image varies significantly, and the division line DL tends to be erroneously recognized. In consideration of this point, the AND circuit DT13 determines whether or not both the pitch condition and the roll condition are satisfied at a predetermined timing.

When the AND circuit DT13 determines that both the pitch condition and the roll condition are satisfied at a predetermined timing, a flag-on circuit DT14 turns on a first flag only for a predetermined time (for example, 1 second) from the determination time point. The turning on of the first flag means that the first undulation condition is satisfied.

Next, the second undulation condition will be described. An extraction circuit DT21 specifies the current position of the subject vehicle 10 based on the signal (current position information) from the position measurement unit 4. In addition, the positions of the left and right front wheels FW and the left and right rear wheels RW are specified using the positional relationship between the position measurement unit 4 and the front wheels FW and the rear wheels RW stored in advance in the memory unit 52. Then, among the road map information stored in the memory unit 52, from the information on the road surface profile within a range forward of the current position by a predetermined distance L1 (for example, 200 m), information of a place having a height difference of the road surface on which the front wheel FW and the rear wheel RW are in contact with the ground, that is, information of a place having a vertical gradient, and information of a place having a height difference of the road surface on which the right wheel and the left wheel are in contact with the ground, that is, information of a place having a horizontal gradient, are extracted. Specifically, after the gradient of the road surface within the predetermined distance L1 from the subject vehicle 10 is smoothed by a moving average, a high-pass component is extracted, and predetermined gradient data (for example, angle data of the gradient) is extracted.

A calculation circuit DT22 calculates a difference Δα between a maximum value and a minimum value of the gradient data within a predetermined range L2 (for example, 50 m) among the gradient data within the predetermined distance L1 extracted by the extraction circuit DT21. In this case, the predetermined range L2 is shifted forward by, for example, 1 m within the predetermined distance L1, and the difference Δα between the maximum value and the minimum value is calculated every time the predetermined range L2 is shifted by 1 m. The difference Δα is calculated for each of data of the vertical gradient in which the front and rear wheels of the subject vehicle 10 are in contact with the ground, that is, data related to the pitch movement, and data of the horizontal gradient in which the left and right wheels are in contact with the ground, that is, data related to the roll movement.

A determination circuit DT23 determines whether or not the difference Δα calculated by the calculation circuit DT22 is a predetermined value Δα1 or more. This determination is a determination as to whether or not the subject vehicle 10 is traveling under a condition in which the division line DL is likely to be erroneously recognized. That is, when the difference Δα is large, the gradient of the road surface is large, and the recognition accuracy of the division line DL recognized by the camera image is poor. In consideration of this point, the determination circuit DT23 determines whether or not Δα≥Δα1 is satisfied.

When the determination circuit DT23 determines that the difference Δα is the predetermined value Δα1 or more, a flag-on circuit DT24 turns on the second flag until the subject vehicle 10 travels a predetermined distance (for example, 200 m) from the determination time point. The turning on of the second flag means that the second undulation condition is satisfied.

Next, the third undulation condition will be described. The calculation circuit DT31 calculates an angle of the division line DL recognized by the camera image, that is, an angle of the division line DL within a predetermined range (for example, 30 m to 100 m) in front of the subject vehicle 10 based on an image signal every predetermined time that is transmitted from the camera 11. More specifically, the angle of the division line DL at each time point is calculated based on a plurality of camera images within the predetermined range in front of the subject vehicle 10 that is acquired at intervals of a predetermined time $\Delta t$ (for example, intervals of 0.2 seconds) from a time point that precedes the current time point by a predetermined time T (for example, 1 second) to the current time point.

Figure 5A:
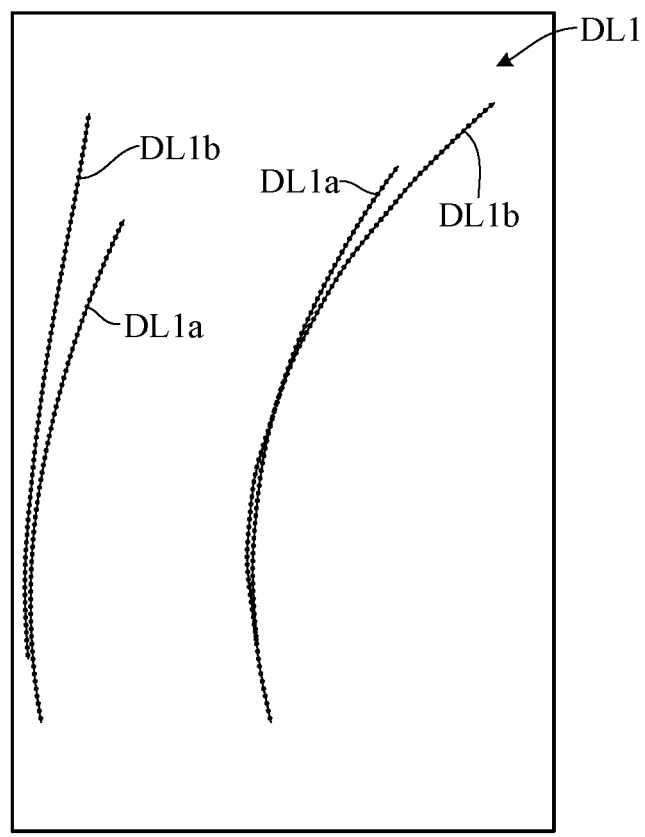
FIG. 5A is a diagram illustrating an example of a division line recognized by a camera image.
Figure 5B:
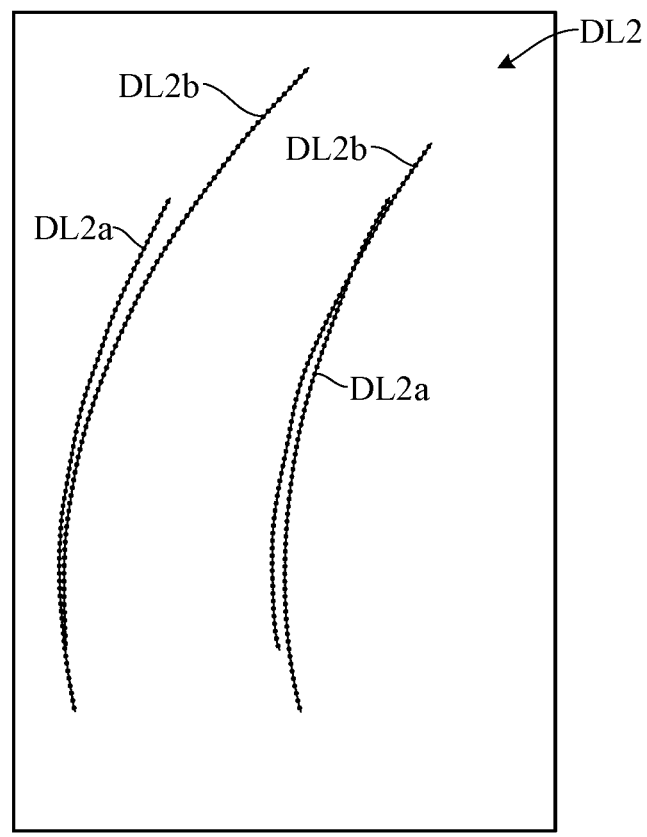
FIG. 5B is a diagram illustrating another example of the division line recognized by the camera image.

FIGS. 5A and 5B are diagrams illustrating examples of the left and right division lines DL recognized by camera images obtained at different time points (first time point and second time point) within the predetermined time T. FIG. 5A is an example of an image DL1 of the division line DL with large variation at each time point, and FIG. 5B is an example of an image DL2 of the division line DL with small variation. FIGS. 5A and 5B illustrate lines DL1a and DL2a respectively connecting point data of the images DL1 and DL2 at the first time point and lines DL1b and DL2b respectively connecting point data of the images DL1 and DL2 at the second time point.

Figure 6:
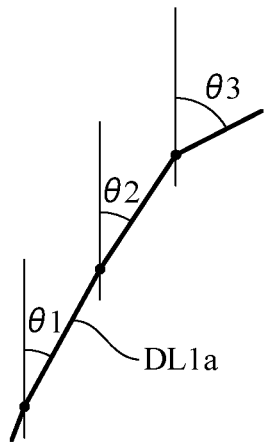
FIG. 6 is an enlarged view of a part of FIG. 5A.

FIG. 6 is an enlarged view of the point data of the image DL1 at the first time point. As illustrated in FIG. 6, the calculation circuit DT31 in FIG. 4 sequentially calculates an angle $\theta$ of a line segment connecting point data of two adjacent points in the straight line DL1a indicating the division line DL, for example, the angle $\theta$ ($\theta 1$, $\theta 2$, $\theta 3$, . . . ) with respect to a straight line indicating the direction of the subject vehicle 10 in the front-rear direction. The angle $\theta$ may be calculated with respect to a line segment connecting not two adjacent points but three or more point data. In addition, the calculation circuit DT31 calculates an average value of the angles $\theta$ ($\theta 1$, $\theta 2$, $\theta 3$, . . . ), obtained from the point data within the predetermined range in front of the subject vehicle 10, as an average angle $\theta av$ at the first time point. Similarly, the average angle $\theta av$ at the second time point and another time point within the predetermined time T is calculated.

A calculation circuit DT32 in FIG. 4 calculates a difference $\Delta\theta av$ between a maximum average angle (maximum angle $\theta v1$) and a minimum average angle (minimum angle $\Delta av2$) among the average angles $\theta av$ of the division line DL at each time point. For example, when the average angle $\theta av$ obtained from the image of the division line DL at the first time point is the maximum angle $\theta av1$, and the average angle $\theta av$ obtained from the image of the division line DL at the second time point is the minimum angle $\theta av2$, the difference $\Delta\theta av$ between these angles is calculated. The difference $\Delta\theta av$ increases as variation in the image of the division line DL at each time point increases. For example, in the example of FIG. 5A, the difference $\Delta\theta av$ is larger than that in the example of FIG. 5B.

A determination circuit DT33 determines whether or not the difference $\Delta\theta av$ calculated by the calculation circuit DT32 is a predetermined value $\Delta\theta av1$ or more. This determination is a determination as to whether or not the subject vehicle 10 is traveling under a condition in which the division line DL is likely to be erroneously recognized. That is, when the difference $\Delta\theta av$ is large, the image of the division line DL significantly varies, and the recognition accuracy of the division line DL recognized by the camera image is poor. In consideration of this point, the determination circuit DT33 determines whether or not $\Delta\theta av \geq \Delta\theta av1$ is satisfied.

When the determination circuit DT33 determines that the difference $\Delta\theta av$ is the predetermined value $\Delta\theta av1$ or more, a flag-on circuit DT34 turns on the third flag only for a predetermined time (for example, 3 seconds) from the determination time point. The turning on of the third flag means that the third undulation condition is satisfied.

In addition to the determination as to whether or not the first undulation condition, the second undulation condition, and the third undulation condition are satisfied, the determination unit 512 determines whether or not a vehicle speed condition and a curve condition are satisfied. Specifically, a determination circuit DT41 determines whether or not vehicle speed V detected by the vehicle speed sensor 22 is a predetermined value (for example, 40 km/h) V1 or more, that is, whether or not the vehicle speed condition is satisfied. A determination circuit DT51 determines a curvature radius of the road within a predetermined distance ahead in the traveling direction from the current position of the subject vehicle 10 based on the current position information and the road map information, and determines whether or not the curvature radius is within a predetermined range (for example, radius 300 m to 800 m), that is, whether or not the curve condition is satisfied. The determination circuits DT41 and DT51 determine whether or not the vehicle speed condition and the curve condition are satisfied every predetermined time.

An AND circuit DT61 determines whether or not the first flag, the second flag, and the third flag are turned on at the same time. That is, it is determined whether or not the first undulation condition, the second undulation condition, and the third undulation condition are satisfied at the same time. In addition, the AND circuit DT61 determines whether or not both the vehicle speed condition and the curve condition are satisfied at the same time. When determining that all of the first undulation condition, the second undulation condition, the third undulation condition, the vehicle speed condition, and the curve condition are satisfied, the AND circuit DT61 determines that the degree of change in the road surface gradient is a predetermined degree or more (the predetermined road surface condition is satisfied). Then, an invalidation flag for invalidating the camera image is output only for a predetermined time (for example, 2 seconds) after the determination is made. On the other hand, when any one of the first undulation condition, the second undulation condition, the third undulation condition, the vehicle speed condition, and the curve condition is not satisfied, it is determined that the predetermined road surface condition is not satisfied.

The setting unit 513 sets a value of reliability with respect to the division line DL recognized by the camera image according to the determination result by the determination unit 512. For example, when the invalidation flag is output from the determination unit 512 (AND circuit DT61), the setting unit 513 sets the reliability with respect to the division line DL recognized by the camera image to 0, and when the invalidation flag is not output from the determination unit 512, the setting unit 513 sets the reliability to a value larger than 0.

The actuator control unit 514 in FIG. 3 recognizes the division line DL according to the reliability set by the setting unit 513. Specifically, when the reliability set by the setting unit 513 is larger than 0, the actuator control unit 514 recognizes the division line DL in front of the subject vehicle 10 based on the image obtained by the camera 11. Then, the target route is generated based on the position of the recognized division line DL, and the actuator AC is controlled so that the subject vehicle 10 travels along the target route by self-driving. On the other hand, when the reliability set by the setting unit 513 is 0, the actuator control unit 514 invalidates the division line DL recognized based on the camera image, and specifies the position of the division line DL in front of the subject vehicle 10 from the road map information stored in the memory unit 52 corresponding to the current position of the subject vehicle 10. Then, the actuator control unit 514 generates the target route based on the position of the division line DL, and controls the actuator AC so that the subject vehicle 10 travels along the target route by self-driving.

When the invalidation flag of the camera image is not output, the setting unit 513 further determines whether or not a difference (angular deviation) between an extending angle of the division line DL in front of the subject vehicle 10 recognized by the camera image and an extending angle of the division line DL in front of the subject vehicle 10 specified by the road map information is a predetermined value (for example,) 3° or more. That is, unmatching determination of the division line DL is performed. When it is determined that the angular deviation is the predetermined value or more, the setting unit 513 lowers the automatic driving level by one step or two or more steps. As a result, for example, drive mode is automatically switched from self-drive mode to manual drive mode. The setting unit 513 does not perform the unmatching determination when the invalidation flag of the camera image is output from the determination unit 512. Therefore, when the invalidation flag is output, the automatic driving level is maintained. The unmatching determination of the division line DL and the change of the automatic driving level may be performed not by the setting unit 513 but by the actuator control unit 514.

When the invalidation flag is continuously output from the determination unit 512 for a predetermined time, a notification control unit 515 outputs a control signal to the display 31, and causes the display 31 as a command output portion to display a hands-on request. Instead of the hands-on request, switching to manual drive mode or notice of switching may be displayed on the display 31. The notification control unit 515 may output the control signal to the speaker in the vehicle to notify the driver of the hands-on request or the switching to manual drive mode by voice. That is, a microphone may be configured as the command output portion instead of the display 31.

Figure 7:
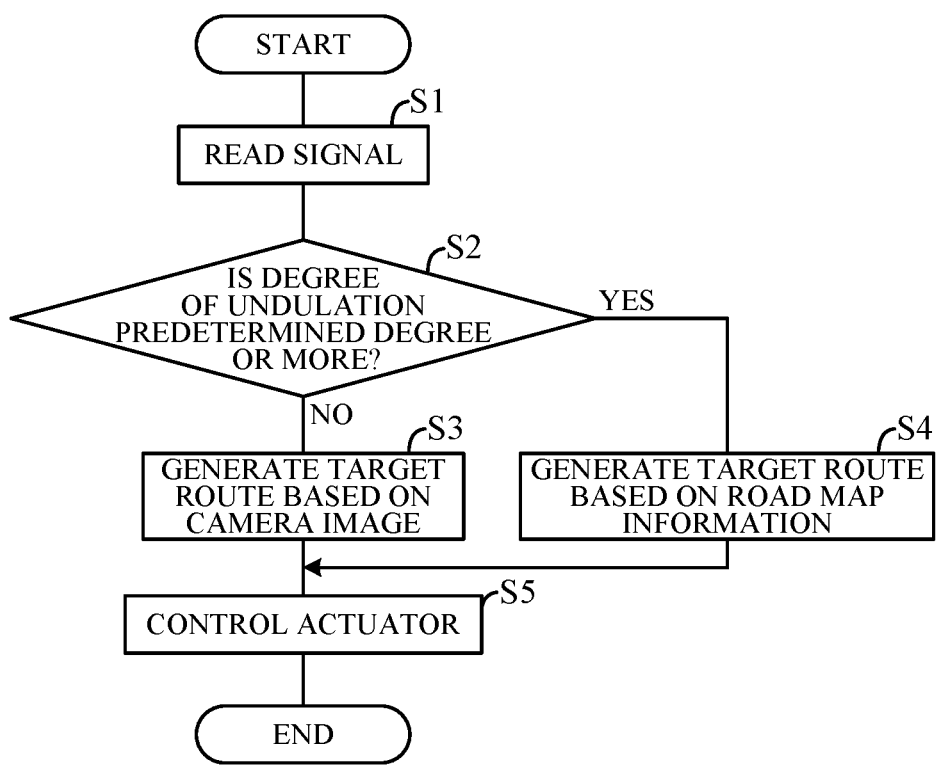
FIG. 7 is a flowchart illustrating an example of processing executed by a controller of FIG. 3.

FIG. 7 is a flowchart illustrating an example of processing executed by the controller 50. The processing shown in this flowchart is started, for example, when self-drive mode is selected, and the processing is repeated at a predetermined cycle as long as self-drive mode is continued.

First, in S1 (S: processing step), signals from the position measurement unit 4, the camera 11, the IMU 21, and the vehicle speed sensor 22 are read. At this time, the road map information stored in the memory unit 52 is also read. Next, in S2, it is determined whether or not the degree of undulation of the road surface in the traveling direction of the subject vehicle 10 is a predetermined degree or more based on the signal and the information read in S1. This determination is a determination as to whether or not the invalidation flag (FIG. 4) of the camera image is output from the AND circuit DT61.

When a negative determination is made in S2, the processing proceeds to S3. For example, when the camera image DL2 as illustrated in FIG. 5B is obtained, the degree of undulation of the road surface is less than the predetermined degree, and in this case, the processing proceeds to S3. In S3, the division line DL is recognized based on the camera image, and the target route is generated using the recognized division line DL. At this time, the unmatching determination of the division line LD is also performed, and when unmatching is determined, the automatic driving level is lowered.

On the other hand, if a positive determination is made in S2, the processing proceeds to S4. For example, when the camera image DL1 as illustrated in FIG. 5A is obtained, the degree of undulation of the road surface is a predetermined degree or more, and in this case, it is determined that the reliability of the division line DL recognized by the camera image is 0, and the processing proceeds to S4. In S4, the division line DL in front of the subject vehicle 10 is specified based on the road map information corresponding to the current position of the subject vehicle 10, and the target route is generated using the specified division line DL. At this time, the unmatching determination of the division line DL is not performed. The processing of S4 is performed only for a predetermined time (for example, 2 seconds) after a positive determination is made in S2.

In S5, a control signal is output to the actuator AC so that the subject vehicle 10 travels along the target route generated in S3 or S4, and the processing ends.

In the above processing, a positive determination is temporarily made in S2, and then, when a negative determination is made again, the actuator AC is controlled using position information of the division line DL obtained by the camera 11. However, when a positive determination is made continuously for more than a predetermined time (for example, 2 seconds) in S2, the hands-on request to the driver is output via the display 31. As a result, it is possible to prevent driving in self-drive mode for a long time in a state where the camera image is invalidated, and the subject vehicle 10 can travel by self-driving in a good manner.

The present embodiment can achieve advantages and effects such as the following:

(1) The vehicle travel control apparatus 101 controls the traveling operation of the subject vehicle 10 including the traveling actuator AC, and includes: the camera 11 that is mounted on the subject vehicle 10 and captures an image of the division line DL in the traveling direction of the subject vehicle 10; the actuator control unit 514 that controls the actuator AC based on the position information of the division line DL obtained by the camera 11 and the reliability (presence or absence of output of invalidation flag) with respect to the position information of the division line DL obtained by the camera 11; the determination unit 512 that determines whether or not the degree of undulation of the road surface in the traveling direction of the subject vehicle 10 is the predetermined degree or more (whether or not the predetermined road surface condition is satisfied); and the setting unit 513 that sets the value of the reliability with respect to the division line DL recognized by the camera image according to the determination result by the determination unit 512 (FIG. 3). When the determination unit 512 determines that the degree of undulation is the predetermined degree or more (when the invalidation flag is output), the setting unit 513 invalidates the camera image of the division line DL (FIG. 4). That is, the reliability with respect to the division line DL recognized by the camera image is set to 0.

When the degree of undulation of the road surface is the predetermined degree or more, a deviation is likely to occur between the position of the division line DL recognized by the camera image and an actual position of the division line DL. Thus, when the actuator AC is controlled based on the camera image, swerving or the like of the subject vehicle 10 is likely to occur. In this regard, in the present embodiment, since the camera image is invalidated when the degree of undulation of the road surface is the predetermined degree or more, it is possible to suppress the swerving or the like of the subject vehicle 10 and perform good self-driving.

(2) The vehicle travel control apparatus 101 further includes: the position information acquisition unit 511a that acquires the current position information of the subject vehicle 10; and the map information acquisition unit 511b that acquires the map information including the information (gradient information) on the undulation of the road surface in the traveling direction of the subject vehicle 10 corresponding to the current position of the subject vehicle 10 specified by the position information acquired by the position information acquisition unit 511a (FIG. 3). The map information acquired by the map information acquisition unit 511b includes the position information of the division line DL in the traveling direction of the subject vehicle 10. When the determination unit 512 determines that the degree of undulation of the road surface is the predetermined degree or more, the actuator control unit 514 controls the actuator AC based on the position information of the division line DL acquired by the map information acquisition unit 511b without using the position information of the division line DL obtained by the camera 11. Accordingly, even when the camera image is invalidated, self-driving can be continued without switching from self-drive mode to manual drive mode. Therefore, a request for the driving operation to the driver is minimized, and comfortable self-driving for the driver can be achieved.

(3) The vehicle travel control apparatus 101 further includes the IMU 21 as a device that detects a physical quantity representing a motion state of the subject vehicle 10 (FIG. 3). The camera 11 is configured to continuously capture an image of the division line DL in the traveling direction of the subject vehicle 10. The determination unit 512 determines whether or not the degree of undulation of the road surface in the traveling direction of the subject vehicle 10 is a predetermined degree or more based on the information on the undulation of the road surface acquired by the map information acquisition unit 511b, the physical quantity (pitch angle, roll angle) measured by the IMU 21, and a degree of variation in position of the division line DL whose image is captured by the camera 11 within the predetermined time T. As described above, by using the image captured by the camera 11, the physical quantity detected by the IMU 21, and the information acquired by the map information acquisition unit 511b, whether or not the degree of undulation of the road surface is the predetermined degree or more can be determined well.

(4) When the determination unit 512 determines that the degree of undulation is less than the predetermined degree (when ON output of the invalidation flag is stopped) while the actuator control unit 514 controls the actuator AC without using the position information of the division line DL obtained by the camera 11, the actuator control unit 514 controls the actuator AC using the position information of the division line DL obtained by the camera 11. As a result, when the degree of the undulation is alleviated after the camera image is invalidated due to deterioration of the degree of undulation of the road surface during traveling, traveling of the subject vehicle 10 is controlled again based on the camera image, so that self-driving can be continuously performed in a good manner.

(5) The vehicle travel control apparatus 101 further includes the notification control unit 515 that outputs a control signal to the display 31 to output a driving operation request to the driver when the determination unit 512 determines continuously for a predetermined time that the degree of undulation is the predetermined degree or more while the subject vehicle 10 travels by self-driving (FIG. 3). As a result, it is possible to notify the driver of a command such as switching to the hands-on or manual driving at a suitable timing during traveling by self-driving, and it is possible to prevent driving in self-drive mode for a long time in the state where the camera image is invalidated.

Various modifications of the above embodiment are possible. Some examples are explained in the following. In the above embodiment, the determination unit 512 determines whether the first undulation condition, the second undulation condition, the third undulation condition, the vehicle speed condition, and the curve condition are satisfied at the same time, and when these conditions are satisfied at the same time, it determines that the degree of undulation of the road surface in the traveling direction of the subject vehicle 10 is the predetermined degree or more and outputs the invalidation flag of the camera image. That is, it is determined that a predetermined road surface condition is satisfied and the reliability of the camera image is decreased. However, the configuration of a determination unit is not limited to the above configuration. For example, when the first undulation condition, the second undulation condition and the third undulation condition other than the vehicle speed condition and the curve condition are satisfied at the same time, it may be determined that the degree of undulation of the road surface in the traveling direction of the subject vehicle 10 is the predetermined degree or more.

The degree of undulation of the road surface may be determined based on only the first undulation condition, i.e., information on the undulation acquired by the map information acquisition unit 511b. The degree of undulation of the road surface may be determined based on only the second undulation condition, i.e., a physical quantity representing the motion state of the vehicle measured by the IMU 21 as a second sensor. The degree of undulation of the road surface may be determined based on only the third undulation condition, i.e., the degree of variation in position of the image of the division line, captured by the camera 11 as a sensor or first sensor within the predetermined time. The degree of undulation of the road surface may be determined based on only the first undulation condition and the second undulation condition, based on only the second undulation condition and the third undulation condition, or based on only the first undulation condition and the third undulation condition.

The determination unit 512 may determine whether the predetermined road surface condition is satisfied based on other parameter of the road surface shape affecting the reliability of the camera image. For example, by determining whether the degree of step of the road surface is a predetermined degree or more, whether the predetermined road surface condition is satisfied may be determined. The undulation of the road surface may be regarded as a change in the gradient of the road surface, and by determining whether the degree of the gradient is a predetermined degree or more, whether the predetermined road surface condition is satisfied may be determined. That is, the determination unit may determine whether or not a predetermined road surface condition is satisfied in which whether a degree of any of a step, a gradient or an undulation of the road surface including the division line in the traveling direction of the vehicle 10 captured or measured by a sensor such as a camera is greater than or equal to a predetermined degree.

Figure 8:
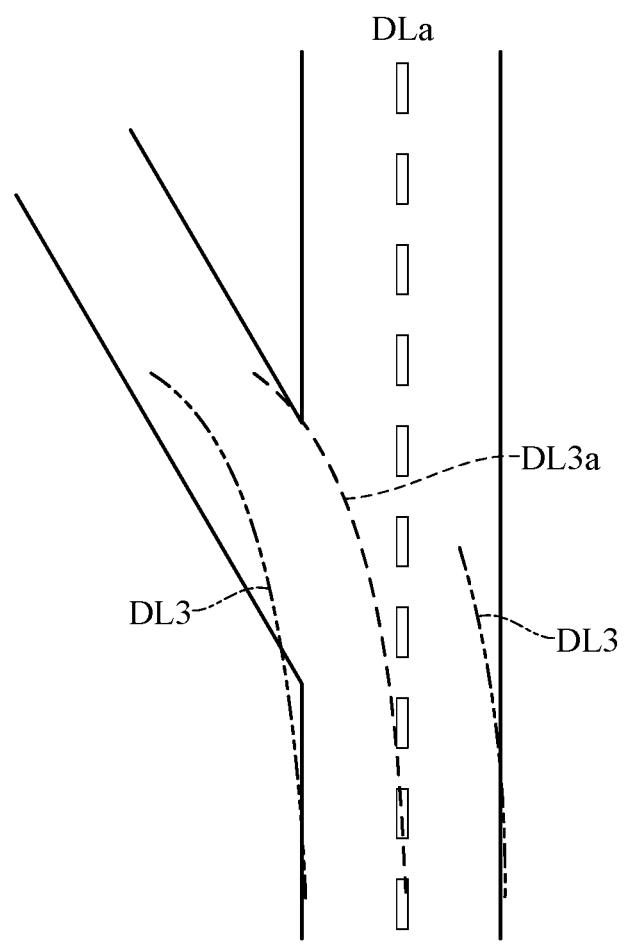
FIG. 8 is a diagram illustrating an example of the division line recognized by the camera image in a branch road.

Not only when the vehicle 10 travels on the road surface with undulations and steps, but also when the vehicle 10 travels on a tunnel road (particularly, an entrance and exit of a tunnel) having a tunnel, a curved road, and a branch road, a deviation is likely to occur between a position of a lane detected by the camera image and an actual position of the lane. That is, even when the vehicle travels on a road having a predetermined structure, the lane position is likely to be deviated. FIG. 8 is a diagram illustrating an example of left and right division lines DL3 recognized by the camera image in a branch road. In FIG. 8, actual division lines in the travel lanes are indicated by solid lines. As illustrated in FIG. 8, when there is a branch road, the division line is bent, and thus the division line DL3 (two-dot chain line) recognized by the camera image is different from the division line (solid line) of the travel lane. As a result, there is a possibility that a deviation occurs between a reference line DL3a passing through a center of the lane recognized by the camera image and a reference line DLa of an actual travel lane.

In consideration of this point, the setting unit 513 may set the reliability with respect to the position information of the division line DL based on the road structure of the road on which the vehicle 10 is traveling or is scheduled to travel. For example, assuming that a predetermined road condition is satisfied when the road on which the vehicle 10 travels is a tunnel road (entrance and exit of a tunnel) having a tunnel, a curved road, or a branch road, when the predetermined road condition is satisfied, the reliability with respect to the position information of the division line DL by the camera image may be lowered (for example, set to 0).

In this case, the determination unit 512 may determine whether or not the road ahead in the traveling direction of the vehicle 10 satisfies the predetermined road condition based on position of the subject vehicle obtained by the position measurement unit 4 and the map information or based on the camera image. That is, the determination unit 512 may determine whether or not the predetermined road condition is satisfied, in which a road including the division line imaged or measured by a sensor such as a camera in the traveling direction of the vehicle 10 is any of a tunnel road having a tunnel, a curved road, and a branch road. This determination is preferably made before the vehicle 10 travels on a road having a predetermined road structure. For example, whether or not the predetermined road condition is satisfied may be determined before a predetermined distance from a point where the vehicle 10 enters the road (tunnel or curve) having the predetermined road structure. Optionally, after the vehicle 10 enters the road having the predetermined road structure, it may be determined whether or not the predetermined road condition is satisfied.

In the above embodiment, when it is determined that the degree of undulation is equal to or greater than a predetermined degree by the determination unit 512, the setting unit 513 disables the camera image, thereby the actuator control unit 514 controls the actuator AC without using the position information of the division line DL by the camera image. In other words, the setting unit 513 sets the reliability with respect to the position information of the division line DL obtained by the camera 11 to 0. However, when the determination unit 512 determines that the predetermined road surface condition is satisfied or the predetermined road condition is satisfied, the setting unit 513 may reduce the reliability with respect to the position information of the division line DL.

The determination similar to the determination of undulation described above may be performed for determining whether another predetermined road surface condition is satisfied, or may be performed for determining whether another predetermined road condition is satisfied. For example, the determination unit 512 may determine whether or not a predetermined road condition is satisfied based on information of a road structure acquired by the map information acquisition unit 511b. The determination unit 512 may determine whether or not a predetermined road condition is satisfied based on a physical quantity measured by a second sensor such as an IMU 21. The determination unit 512 may determine whether or not a predetermined road condition is satisfied based on the degree of variation in the position of the division line imaged by the camera 11 serving as a sensor or a first sensor within a predetermined time.

The setting unit 513 may set the reliability using position information of the division line DL by the camera image and road map information acquired by the map information acquisition unit 511b. In this case, the setting unit may set a reliability with respect to positional information of the division line DL obtained by the camera 11, in accordance with the degree of undulation on the road surface or the like, and change a weighting of division line data included in information of the camera image and division line data included in road map information in accordance with the reliability. For example, the smaller the reliability, the smaller the weighting of the division line data by the camera image, or the larger the weighting of the division line data of the road map information. Then, the division line DL may be specified by using an average value or the like of each data after weighting. In any case, when it is determined that the predetermined road surface condition is satisfied or the predetermined road condition is satisfied, as long as the reliability is set to a value lower than that when it is determined that the predetermined road surface condition is not satisfied or the predetermined road condition is not satisfied, the configuration of the setting unit may be any configuration.

Although in the above embodiment, the division line DL in the traveling direction of the subject vehicle 10 is captured by the vehicle-mounted camera 11, the division line DL may be measured by another sensor mounted on the vehicle. Therefore, an actuator control unit may control an actuator for traveling based on position information of the division line DL obtained by a sensor other than the camera and a reliability of the positional information of the division line DL obtained by the sensor. Although in the above embodiment, the rotational motion of the subject vehicle 10 about three orthogonal axes is measured by the IMU 21, it may be measured by other sensors. A physical quantity representing the state of motion of the vehicle may be measured by other sensors. Therefore, the configuration of a second sensor is not limited to those described above.

Although in the above embodiment, the actuator control unit 514 controls the actuator AC in accordance with the reliability with respect to the positional information of the division line DL obtained by the camera 11, it may control actuator AC without using the reliability. That is, when the determination unit 512 determines that the predetermined road surface condition is not satisfied, the actuator control unit 514 may control the actuator for traveling based on the position information of the division line obtained by a sensor such as the camera 11, while when the determination unit 512 determines that the predetermined road surface condition is satisfied, the actuator control unit 514 may stop controlling of the actuator based on the position information of the division line obtained by the sensor such as the camera 11. When the determination unit 512 determines that the predetermined road condition is not satisfied, the actuator control unit 514 may control the actuator for traveling based on the position information of the division line obtained by a sensor such as the camera 11, while when the determination unit 512 determines that the predetermined road condition is satisfied, the actuator control unit 514 may stop controlling of the actuator based on the position information of the division line obtained by the sensor such as the camera 11.

Although in the above embodiment, the vehicle travel control apparatus 101 is applied to the self-driving vehicle having a self-driving capability, a vehicle travel control apparatus according to the present invention can be also applied to vehicle (for example, vehicle having a driver assistance capability) other than the self-driving vehicle.

The present invention can also be used as a vehicle travel control method for controlling a traveling operation of a vehicle including an actuator for traveling. The vehicle travel control method includes: capturing an image of a division line in a traveling direction of the vehicle or measuring the division line; controlling the actuator based on a position information of the division line obtained by capturing or measuring and a reliability with respect to the position information of the division line, and setting the reliability based on a shape of a road surface or a road structure in the traveling direction of the vehicle.

The above embodiment can be combined as desired with one or more of the above modifications. The modifications can also be combined with one another.

According to the present invention, it is possible to satisfactorily control a traveling operation of a vehicle based on a positional information of a division line obtained by a sensor.

Above, while the present invention has been described with reference to the preferred embodiments thereof, it will be understood, by those skilled in the art, that various changes and modifications may be made thereto without departing from the scope of the appended claims.

What is claimed is:

1. A vehicle travel control apparatus configured to control a traveling operation of a vehicle including an actuator for traveling, the vehicle travel control apparatus comprising:
    a first sensor mounted on the vehicle to capture an image of a division line in a traveling direction of the vehicle or measure the division line;
    a second sensor mounted on the vehicle to detect a pitch angle and a roll angle of the vehicle; and
    an electronic control unit including a microprocessor and a memory connected to the microprocessor, wherein
    the microprocessor is configured to perform:
    determining whether a predetermined road surface condition in which a degree of undulation of a road surface including the division line in the traveling direction of the vehicle captured or measured by the first sensor is greater than or equal to a predetermined degree, is satisfied;
    controlling the actuator based on position information of the division line obtained by the first sensor and a reliability with respect to the position information of the division line obtained by the first sensor, and
    setting the reliability so that the reliability set when it is determined that the predetermined road surface condition is satisfied is lower than the reliability set when it is determined that the predetermined road surface condition is not satisfied, and
    the microprocessor is configured to perform
    the determining including determining that the predetermined road surface condition is satisfied when it is determined that a predetermined change of a pitch rate of the vehicle and a predetermined change of a roll rate of the vehicle occur simultaneously based on the pitch angle and the roll angle detected by the second sensor,
    the predetermined change of the pitch rate includes a change of a posture of the vehicle from a head-down in which a front of the vehicle faces downward to a head-up in which the front of the vehicle faces upward, and
    the predetermined change of the roll rate includes a change of the posture of the vehicle from a right-roll in which the vehicle inclines to a right to a left-roll in which the vehicle inclines to a left, or a change of the posture of the vehicle from the left-roll to the right-roll.

2. The vehicle travel control apparatus according to claim 1, wherein
    the microprocessor is configured to further perform
    acquiring information of a current position of the vehicle,
    acquiring map information including information of the road surface in the traveling direction at the current position of the vehicle specified by the information, and
    the determining including determining whether the predetermined road surface condition is satisfied based on the map information.

3. The vehicle travel control apparatus according to claim 2, wherein
    the position information of the division line in the traveling direction of the vehicle is included in the map information, and
    the microprocessor is configured to perform
    the controlling including controlling the actuator further based on the position information of the division line.

4. The vehicle travel control apparatus according to claim 3, wherein
    the microprocessor is configured to perform
    the controlling including controlling the actuator based on the position information of the division line included in the map information not based on the position information of the division line obtained by the first sensor, when it is determined that the predetermined road surface condition is satisfied.

5. The vehicle travel control apparatus according to claim 4, wherein
    the microprocessor is configured to perform
    the determining including determining whether the predetermined road surface condition is satisfied, based on the information of the road surface included in the map information and the pitch angle and the roll angle detected by the second sensor.

6. The vehicle travel control apparatus according to claim 5, wherein
    the first sensor is configured to continuously capture the image of the division line in the traveling direction of the vehicle or continuously measure the division line, and
    the microprocessor is configured to perform
    the determining including determining whether the predetermined road surface condition is satisfied, based on the information of the road surface included in the map information, the pitch angle and the roll angle detected by the second sensor and a degree of variation on a position of the division line captured or measured within a predetermined time period by the first sensor.

7. The vehicle travel control apparatus according to claim 4, wherein
the microprocessor is configured to perform
the controlling including controlling the actuator based on the position information of the division line obtained by the first sensor, when it is determined that the predetermined road surface condition is not satisfied.

8. The vehicle travel control apparatus according to claim 1, wherein
the first sensor is configured to continuously capture the image of the division line in the traveling direction of the vehicle or continuously measure the division line, and
the microprocessor is configured to perform
the determining including determining whether the predetermined road surface condition is satisfied, based on a degree of variation on a position of the division line captured or measured within a predetermined time period by the first sensor.

9. The vehicle travel control apparatus according to claim 1, wherein
the vehicle is a self-driving vehicle having a self-driving function in which the actuator is controlled in accordance with an action plan, and
the vehicle travel control apparatus further comprises
a command output portion outputting request information of a driving operation to a driver when it is determined that the predetermined road surface condition is continuously satisfied for a predetermined time period during traveling in a self-driving.

10. The vehicle travel control apparatus according to claim 9, wherein
the microprocessor is configured to perform
acquiring information of a current position of the vehicle,
acquiring map information including the position information of the division line in the traveling direction at the current position of the vehicle specified by the information, and
the controlling including controlling the actuator based on the position information of the division line included in the map information not based on the position information of the division line obtained by the first sensor when it is determined that the predetermined road surface condition is satisfied.

11. The vehicle travel control apparatus according to claim 10, wherein
the microprocessor is configured to perform
the controlling including determining whether a difference between an angle of the division line recognized by the first sensor and an angle of the division line specified by the map information is greater than or equal to a predetermined value and lowering a level in the self-driving when it is determined that the difference is greater than or equal to the predetermined value.

12. A vehicle travel control apparatus configured to control a traveling operation of a vehicle including an actuator for traveling, the vehicle travel control apparatus comprising:
a first sensor mounted on the vehicle to capture an image of a division line in a traveling direction of the vehicle or measure the division line;
a second sensor mounted on the vehicle to detect a pitch angle and a roll angle of the vehicle; and
an electronic control unit including a microprocessor and a memory connected to the microprocessor, wherein the microprocessor is configured to perform:
controlling the actuator based on position information of the division line obtained by the first sensor,
determining whether a predetermined road surface condition in which a degree of undulation of a road surface including the division line in the traveling direction of the vehicle captured or measured by the first sensor is greater than or equal to a predetermined degree, is satisfied, and
the controlling including controlling the actuator based on the position information of the division line obtained by the first sensor when it is determined that the predetermined road surface condition is not satisfied, while stopping controlling the actuator based on the position information of the division line obtained by the first sensor when it is determined that the predetermined road surface condition is satisfied, and
the microprocessor is configured to perform
the determining including determining that the predetermined road surface condition is satisfied when it is determined that a predetermined change of a pitch rate of the vehicle and a predetermined change of a roll rate of the vehicle occur simultaneously based on the pitch angle and the roll angle detected by the second sensor,
the predetermined change of the pitch rate includes a change of a posture of the vehicle from a head-down in which a front of the vehicle faces downward to a head-up in which the front of the vehicle faces upward, and
the predetermined change of the roll rate includes a change of the posture of the vehicle from a right-roll in which the vehicle inclines to a right to a left-roll in which the vehicle inclines to a left, or a change of the posture of the vehicle from the left-roll to the right-roll.

13. A vehicle travel control method configured to control a traveling operation of a vehicle including an actuator for traveling, the vehicle travel control method comprising:
capturing an image of a division line in a traveling direction of the vehicle or measuring the division line;
determining whether a predetermined road surface condition in which a degree of undulation of a road surface including the division line obtained by the capturing or the measuring is greater than or equal to a predetermined degree, is satisfied;
controlling the actuator based on position information of the division line obtained by the capturing or the measuring, and a reliability with respect to the position information of the division line, and
setting the reliability so that the reliability set when it is determined that the predetermined road surface condition is satisfied is lower than the reliability set when it is determined that the predetermined road surface condition is not satisfied, wherein
the determining includes determining that the predetermined road surface condition is satisfied when it is determined that a predetermined change of a pitch rate of the vehicle and a predetermined change of a roll rate of the vehicle occur simultaneously based on a pitch angle and a roll angle,
the predetermined change of the pitch rate includes a change of a posture of the vehicle from a head-down in which a front of the vehicle faces downward to a head-up in which the front of the vehicle faces upward, and
the predetermined change of the roll rate includes a change of the posture of the vehicle from a right-roll in which the vehicle inclines to a right to a left-roll in which the vehicle inclines to a left, or a change of the posture of the vehicle from the left-roll to the right-roll.

14. The vehicle travel control apparatus according to claim 1, wherein
the microprocessor is configured to perform
the determining including determining that the predetermined road surface condition is satisfied when the vehicle rolls to the left in the posture of the head-up after rolling to the right in the posture of the head-down or when the vehicle rolls to the right in the posture of the head-up after rolling to the left in the posture of the head-down.

15. The vehicle travel control apparatus according to claim 1, wherein
the microprocessor is configured to perform
the determining including determining whether a pitch condition in which a change rate of the pitch angle detected by the second sensor becomes smaller than or equal to a first negative predetermined value within a predetermined time after the change rate of the pitch angle has become greater than or equal to a second positive predetermined value, is satisfied, and whether a roll condition in which a change rate of the roll angle detected by the second sensor becomes smaller than or equal to a third negative predetermined value within the predetermined time after the change rate of the roll angle has become greater than or equal to a fourth positive predetermined value or the change rate of the roll angle detected by the second sensor becomes greater than or equal to the fourth positive predetermined value within the predetermined time after the change rate of the roll angle has become smaller than or equal to the third negative predetermined value, is satisfied, and determining that the predetermined road surface condition is satisfied when it is determined that the pitch condition is satisfied and the roll condition is satisfied.

* * * * *